W. O. BARNES.
MACHINE FOR GRINDING FORMED CUTTERS.
APPLICATION FILED OCT. 11, 1915.
1,196,420.
Patented Aug. 29, 1916.
3 SHEETS—SHEET 1.
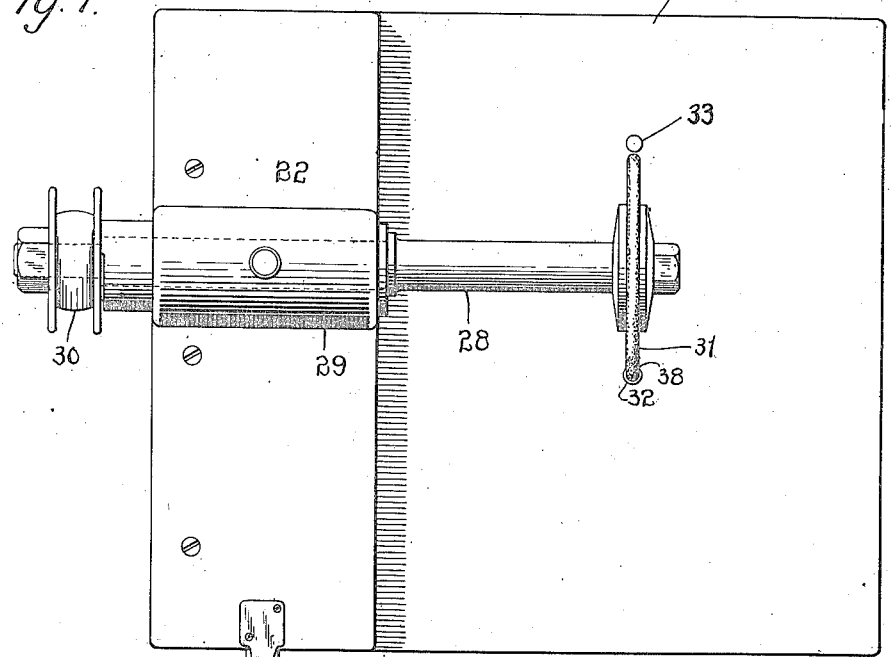
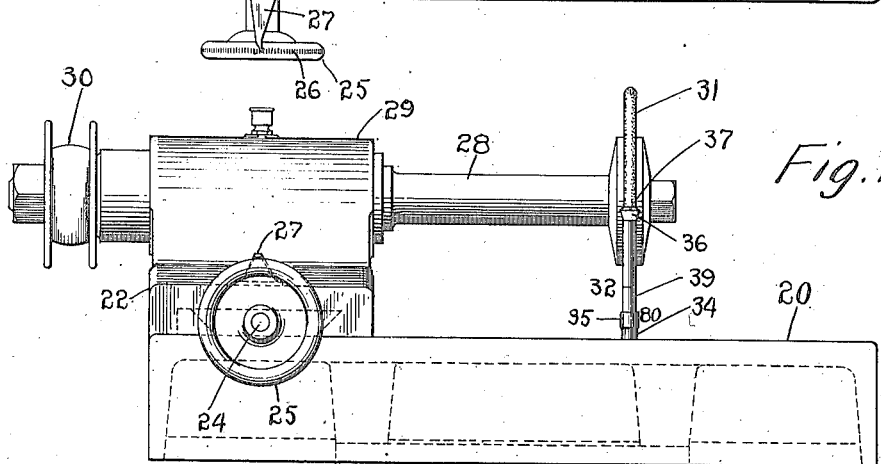
WITNESS
H. W. Meade
INVENTOR
William O. Barnes
BY
N. W. Wooster
ATTORNEY W. O. BARNES.
MACHINE FOR GRINDING FORMED CUTTERS.
APPLICATION FILED OCT. 11, 1915.
1,196,420.
Patented Aug. 29, 1916.
3 SHEETS—SHEET 2.
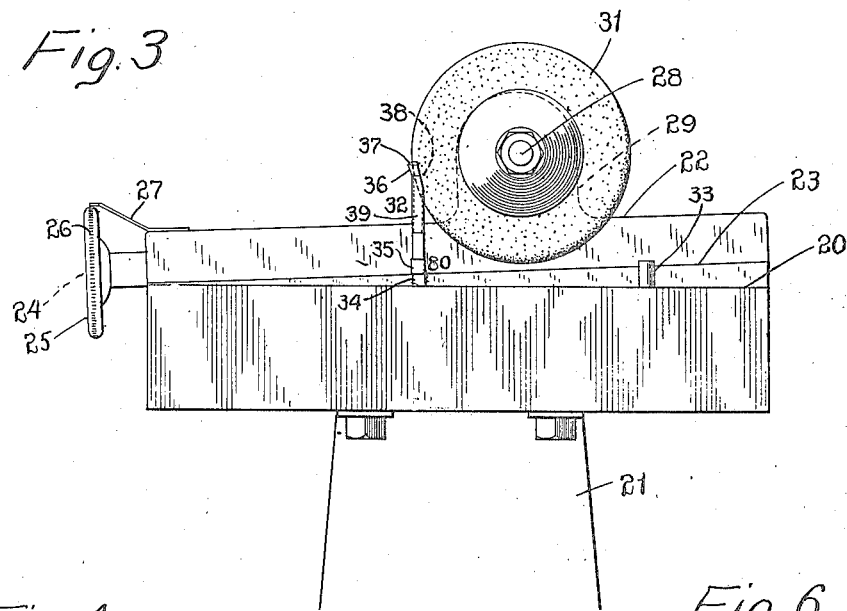
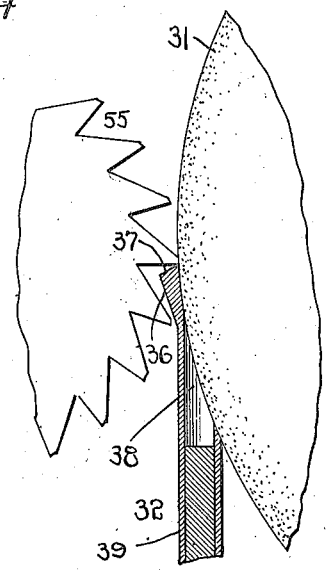
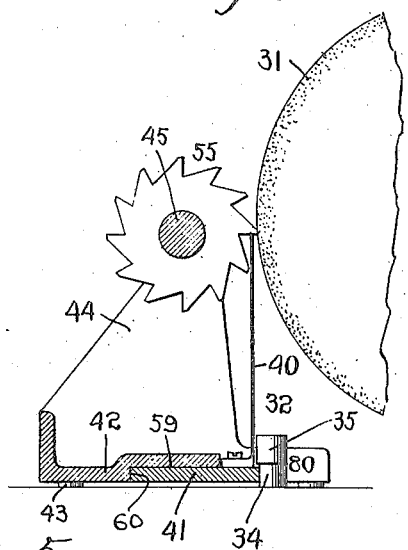
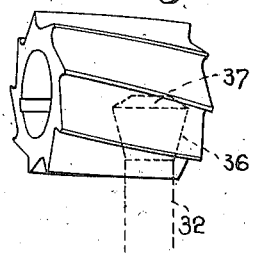
WITNESS
H. V. Meade
INVENTOR
William O. Barnes
BY
A. M. Wooster
ATTORNEY W. O. BARNES.
MACHINE FOR GRINDING FORMED CUTTERS.
APPLICATION FILED OCT. 11, 1915.
1,196,420.
Patented Aug. 29, 1916.
3 SHEETS—SHEET 3.
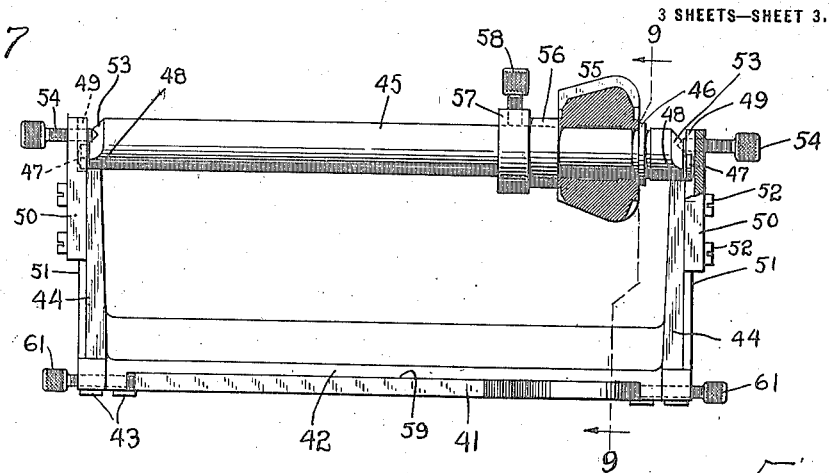
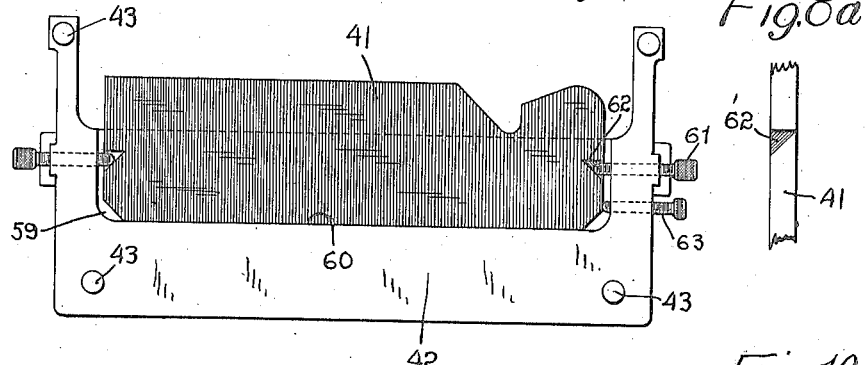
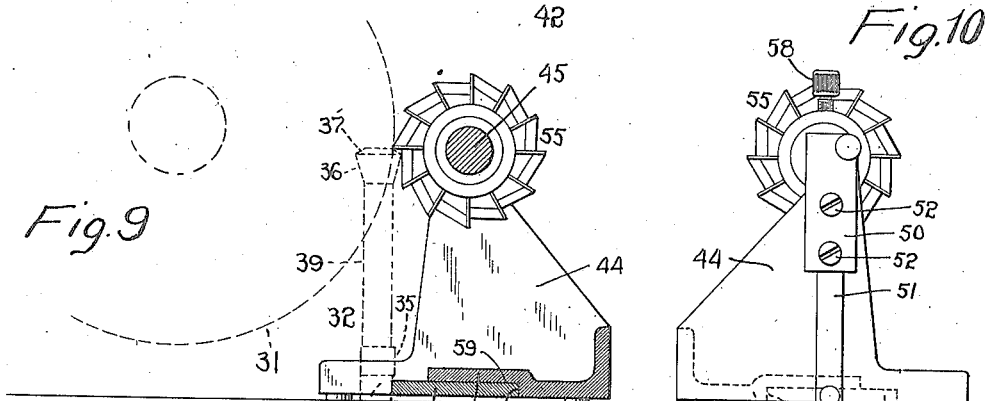
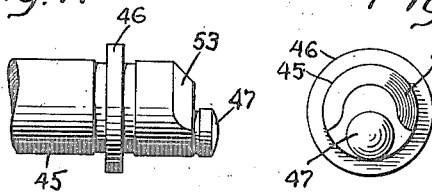
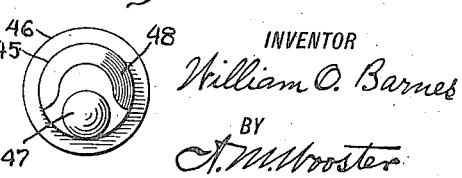
WITNESS
H. W. Meade
INVENTOR
William O. Barnes
BY
A. M. Wooster
ATTORNEY

UNITED STATES PATENT OFFICE.

WILLIAM O. BARNES, OF LEOMINSTER, MASSACHUSETTS.

MACHINE FOR GRINDING FORMED CUTTERS.

1,196,420.

Specification of Letters Patent.

Patented Aug. 29, 1916.

Application filed October 11, 1915. Serial No. 55,197.

*To all whom it may concern:*

Be it known that I, WILLIAM O. BARNES, a citizen of the United States, residing at Leominster, county of Worcester, State of Massachusetts, have invented an Improvement in Machines for Grinding Formed Cutters, of which the following is a specification.

This invention relates to the grinding of the profile faces of the teeth of formed cutters, so called, that is teeth of irregular outline.

Heretofore, formed cutters have ordinarily been sharpened by grinding the radial faces of the teeth, the profile faces of the teeth having been machined or filed to the desired configuration, before hardening the cutter. When cutters are sharpened by grinding the radial faces of the teeth, all inaccuracies in outline due to distortion in hardening, are retained, and furthermore the life of the cutter is greatly reduced owing to the fact that it is necessary to grind away an excessive amount of the teeth in order to sharpen edges that may have become dulled. So far as I am aware, much of the grinding of the profile faces of the teeth of formed cutters has heretofore been done by free-hand methods, which requires a very high degree of skill on the part of the operator and causes the loss of an excessive amount of time. In order to overcome these difficulties and render the grinding of the profile faces of formed teeth a comparatively simple matter, I have produced a machine that will enable an unskilled operator to grind the profile faces of cutter teeth of most irregular outline very accurately and expeditiously.

With these ends in view the invention consists in certain constructions and in certain parts, improvements and combinations, which will be hereinafter described and then specifically pointed out in the claims hereunto appended.

In the accompanying drawings forming a part of this specification, Figure 1 is a plan view of my novel machine; Fig. 2 a front elevation corresponding therewith; Fig. 3 a side elevation as seen from the right in Figs. 1 and 2; Fig. 4 a detail view on an enlarged scale, partly in section, showing the position of the cutter, the grinding wheel and the rest during the grinding operation; Fig. 5 a detail view showing the use of the rest in connection with a cutter having spiral teeth; Fig. 6 a view corresponding with Fig. 4, but on a reduced scale illustrating a variant form of rest; Fig. 7 an elevation of the jig by which the cutter is carried while being ground, the cutter being in section and a portion of the jig broken away; Fig. 8 an inverted plan view corresponding with Fig. 7; Fig. 8ª a detail end view on an enlarged scale showing one of the beveled notches in the templet for engagement by an adjusting screw; Fig. 9 a section on the line 9—9 in Fig. 7, looking in the direction of the arrows; Fig. 10 an elevation as seen from the left in Fig. 7; Fig. 11 an elevation on an enlarged scale of the right end (as seen in Fig. 7) of the arbor; Fig. 12 an end view as seen from the right in Fig. 11.

20 denotes the table which is shown as carried by a pedestal 21, and 22 the spindle head which is mounted to slide on a way, shown only in dotted lines in Fig. 2, on an incline 23 upon the table. The spindle head is adjusted to the required position for use by means of a screw 24 carrying a hand wheel 25, which is provided with peripheral gage-marks 26 adapted to register with a pointer 27 carried by the spindle head.

28 denotes the spindle which is mounted in a bearing 29 upon the head. The spindle is retained against endwise movement, and the bearing is made of sufficient width to prevent lateral vibration or shake of the spindle, to which rotation is applied by means of a belt (not shown) passing over a pulley 30.

31 denotes the grinding wheel which is secured at the opposite end of the spindle, 32 a rest for cutter teeth in grinding, 33 a rough wheel truing pin and 80 a contact member having a guide surface 34 for a templet, presently to be described, and a guide surface 35 for a wheel truing device, presently to be described. The curvature of surface 34 must correspond with the lateral curvature of the nose of the grinding wheel. Surface 35 is eccentric to surface 34. The axis of the rough wheel truing pin and the axes of curvature 34 and 35 all lie in the central vertical plane of the grinding wheel, the axis of curvature of surface 35 being farther from the axis of the grinding wheel than the axis of curvature of surface 34.

The rest and the contact member may be formed integral as in Figs. 2, 3, and 9, or may be separate parts, as in Fig. 6. When formed cutters having concave arcs of very small radius are to be ground, it is sometimes necessary to turn the nose of the grinding wheel to a corresponding curvature, which would be of a smaller radius than the radius of surface 34 of the contact member. In such cases it may be found desirable to have the rest and contact member independent of each other, as in Fig. 6. In this form, the contact member and surfaces 34 and 35 are the same as before, but the shank of the rest, indicated by 40, is a spring arm which may be secured to the templet 41 as in Fig. 6, or if preferred, to the jig, which I shall presently describe.

Under ordinary conditions, it will be found convenient to have the contact member and the rest formed integral. In this form, the shank of the rest, indicated by 39, extends upward from the contact member and may be reduced in diameter, as shown in Figs. 2 and 3, or not, as preferred. At the upper end of the shank is an enlargement 36 upon which the teeth of the cutter rest individually during the grinding operation. This enlargement is shown as beveled, as at 37 (see Fig. 4) to provide for grinding cutters having spiral teeth. One side of the enlargement is provided with a groove or opening 38 to receive the edge of the grinding wheel. The operative portion of the rest may if preferred be made tubular instead of solid, as shown in Fig. 4, and made detachable from the shank, so that it may be removed and a new one substituted in the event of its becoming worn by contact with the grinding wheel.

The jig comprises a base 42 having on its under side feet 43 adapted to slide over the table and at its ends standards 44 which carry the cutter arbor 45. The arbor is provided with a flange 46 and with eccentric trunnions 47, the trunnions being in alinement and their axes parallel with the axis of the arbor. The upper ends of the standards are flat surfaces indicated by 48 which are parallel with the table upon which the jig rests. The ends of the arbor rest upon these surfaces and the trunnions project outward therefrom and engage grooves 49 in blocks 50 which are formed upon or rigidly secured to the standards, preferably in the manner shown in the drawings, the standards being provided with ribs 51 engaging corresponding grooves in the blocks, which are locked in place by screws 52. The ends of the trunnions are preferably convex curves, the extreme length of the arbor and trunnions is just equal to the distance between the bottoms of the grooves in the blocks, and the diameter of the trunnions is just equal to the width of the grooves in the blocks. This construction permits the arbor to be oscillated to adjust the cutter teeth relatively to the templet in the horizontal plane without changing the adjustment in the vertical plane, the trunnions sliding in the grooves. In other words, I maintain parallelism between the axis of the arbor and the table upon which the jig rests and also retain the axis of the arbor at a uniform height above the table. The ends of the arbor are beveled as at 53. 54 denotes set screws having pointed ends which are so positioned in the blocks as to engage the bevels on opposite sides of the axis of the arbor and above the axis thereof, so that when tightened up, the set screws will hold the arbor firmly in contact with surfaces 48 on the standards and at any adjustment laterally that may be required.

The cutter, indicated by 55, is adapted to slide over the arbor and is placed with one side against flange 46. A loose collar 56 is placed against the opposite side of the cutter and this collar in turn is secured by a collar 57 shown as locked in place by a set screw 58, leaving the cutter free to be rotated on the arbor without endwise or lateral movement. When the arbor and cutter are in place, the side of the cutter will project beyond the front edge of the plate of the jig (see Fig. 9). The under side of the plate of the jig is provided with a recess 59 which extends from the front edge backward and is bounded in the rear by a straight edge 60 which is parallel with the axis of the arbor. This recess is adapted to receive the templet 41 which is a flat plate, the front edge of which is shaped to conform to the outline of the teeth of the cutter. The templet may be adjusted longitudinally in the recess and is locked in place therein by means of adjusting screws 61 which engage beveled notches 62 in the ends of the templet. The bevels of these notches are so positioned that the engagement of the ends of the adjusting screws therewith tends to force the templet inward against the straight edge and upward against the upper wall of the recess. It should be noted that in adjusting the templet longitudinally by means of the adjusting screws its parallelism with the arbor and its lateral position relatively thereto are not changed to the slightest extent.

63 is a stop screw which may be used when it is desired to remove a templet and afterward to replace it without necessitating a new adjustment of the templet.

In grinding a cutter, it is necessary in order to obtain the required clearance angle on the teeth, to perform the grinding operation at a point below the horizontal diameter of the grinding wheel. Consequently, the top of the rest by which the teeth of the cutter are supported while being ground is located the required distance below the horizontal diameter of the grinding wheel, and the parts of the jig are so proportioned that when the jig is in operative position, the axis of the arbor and the top of the rest are at exactly the same height above the table. The periphery of the grinding wheel is so shaped that the edge curvature on a horizontal section through the wheel at the top of the rest will exactly correspond with the curvature of templet guide surface 34 and will lie in exact vertical alinement therewith. In other words, the center of curvature of the wheel truing guide surface must project beyond the center of curvature of the templet guide surface a distance equal to the difference between half the horizontal diameter of the grinding wheel and half the chord of the grinding wheel at the top of the rest. The center of curvature of the path traversed by the point of the diamond (presently to be described) in the truing operation is in exact vertical alinement with the center of curvature of guide surface 35, and the edge of the cutter tooth during the grinding operation is in exact vertical alinement with guide surface 34 which is engaged by the templet.

In use, one of the cutter teeth is placed upon the top of the rest, the jig is moved forward until the edge of the templet engages the templet guide surface and then the jig is moved laterally relatively to the grinding wheel, the templet being retained constantly in engagement with the guide surface, so that the tooth of the cutter is ground by the grinding wheel to a shape exactly corresponding with the contour of the templet.

Having thus described my invention, I claim:

1. A machine for grinding profile faces of formed cutter teeth comprising a table, a grinder supported above said table, a rest for the cutter teeth, a contact member carried by the table and having a curved templet-guiding surface, and a profiled templet movable in a rectilinear path in engagement with said templet-guiding surface.

2. A machine for grinding the profile faces of formed cutter teeth, comprising a grinder, a rest for cutter teeth, a templet-guide, a jig provided with means for supporting the cutter to be ground, and a templet carried by said jig and positioned to engage said guide.

3. A machine for grinding the profile faces of formed cutter teeth, comprising a grinder, a rest for cutter teeth, a templet guide, a jig provided with a supporting base having a recess therein, said jig having means for supporting the cutter to be ground, and a templet secured within said recess and positioned to engage said guide.

4. A machine for grinding the profile faces of formed cutter teeth, comprising a grinder, a rest for cutter teeth, a templet guide, a jig provided with means for supporting the cutter to be ground, a templet carried by said jig and positioned to engage said guide, and means for adjusting the grinder to compensate for wear.

5. In a machine of the character described, the combination with a grinding wheel, a spindle head, a spindle mounted in the head by which the wheel is carried, and an incline on which the head is adapted to slide to raise or lower the spindle and wheel, of a jig, a templet carried thereby, a rest for cutter teeth, and a guide surface for engagement by the templet.

6. In a machine of the character described, the combination with a grinding wheel, a spindle head, a pointer carried thereby, a spindle mounted in the head by which the wheel is carried, an incline on which the head is adapted to slide, and a screw for adjusting the spindle head on the incline and which is provided with a hand wheel having peripheral gage-marks coöperating with the pointer, of a jig, a templet carried thereby, a rest for cutter teeth, and a guide surface for engagement by the templet.

7. A machine for grinding the profile faces of formed cutter teeth comprising a grinding wheel, a templet, a jig by which the templet is carried, means for adjusting the templet longitudinally with respect to the jig, a rest by which cutter teeth are supported to engage the periphery of the grinding wheel, and a guide surface for engagement by the templet.

8. A machine for grinding the profile faces of formed cutter teeth comprising a grinding wheel, a table, a jig freely movable over the table, a templet carried by said jig, a cutter tooth supporting rest extending from the table, and a guide surface attached to said table for engagement by the templet.

9. A machine of the character described comprising a grinding wheel, a templet, a rest by which cutter teeth are supported to engage the periphery of the wheel below its horizontal diameter, and a contact member having a curved guide surface for the templet, said guide surface being in vertical alinement with the operative point in the periphery of the wheel and having a curvature corresponding with the lateral curvature of the nose of the wheel.

10. In a machine of the character described, the combination with a grinding wheel and a templet, of a rest by which cutter teeth are supported to engage the periphery of the wheel, said rest comprising a guide surface for the templet, a shank and an enlargement provided with an opening to receive the edge of the wheel.

11. In a machine of the character described, the combination with a grinding wheel and a templet, of a rest by which cutter teeth are supported to engage the periphery of the wheel, said rest comprising a guide surface for the templet, a shank and an enlargement provided with a bevel and with an opening in one side to receive the edge of the wheel.

12. A rest of the character described comprising a curved guide surface, above said surface another curved guide surface eccentric thereto, above said second curved guide surface a shank and at the upper end of the shank an enlargement having in one side an opening, substantially as shown, for the purpose specified.

13. In a machine of the character described, the combination with a grinding wheel, a rest by which cutter teeth are supported to engage the periphery of the wheel and a guide surface, of a templet adapted to engage said surface, and a jig by which the templet is carried, said jig being provided with a straight edge against which the templet rests.

14. In a machine of the character described, the combination with a grinding wheel, a rest by which cutter teeth are supported to engage the periphery of the wheel, and a guide surface, of a templet adapted to engage said surface, and a jig by which the templet is carried, said jig being provided with a straight edge against which the templet rests, and with means for adjusting the templet longitudinally.

15. In a machine of the character described, the combination with a grinding wheel, a rest by which cutter teeth are supported to engage the periphery of the wheel, and a guide surface, of a templet adapted to engage said surface, and a jig by which the templet is carried, said jig comprising a plate having a recess bounded in the rear by a straight edge against which the templet rests, and means for adjusting the templet longitudinally.

16. In a machine of the character described, the combination with a grinding wheel, a rest by which cutter teeth are supported to engage the periphery of the wheel, and a guide surface, of a templet adapted to engage said surface, and a jig by which the templet is carried, said templet being provided in its ends with beveled notches and said jig with a recess having a straight edge and with adjusting screws which engage the notches and force the templet against the straight edge and against the wall of the recess.

17. In a machine of the character described, the combination with a grinding wheel, a rest by which cutter teeth are supported to engage the periphery of the wheel, and a guide surface, of a templet adapted to engage said surface, and a jig by which the templet is carried, said jig being provided with means for adjusting the templet longitudinally and with a stop screw engaging one end of the templet.

18. A machine of the character described, comprising a table, a grinding wheel, a templet, and a rest by which cutter teeth are supported to engage the periphery of the wheel, a jig by which the templet is carried and an arbor also carried by the jig on which a cutter to be ground is rotatably mounted, and means for laterally adjusting said arbor.

19. A machine of the character described, comprising a grinding wheel, a jig provided with a base and upright standards, a templet carried by said base, a cutter arbor adjustably mounted on said standards, and a rest for the cutter teeth.

20. A machine of the character described comprising a grinding wheel, a jig provided with a base and upright standards, a templet carried by said base, a cutter carrying arbor supported by said standards, and means for adjusting said arbor and the cutter carried thereby toward or from the grinding wheel.

21. In a machine of the character described, the combination with a grinding wheel, a templet and a rest for cutter teeth in grinding, of a jig by which the templet is carried, standards on the jig provided with grooved blocks, a cutter arbor resting on the standards and having eccentric trunnions engaging the grooves, and set screws in the blocks for locking the arbor at any required lateral adjustment.

22. In a machine of the character described, the combination with a grinding wheel, a templet and a rest for cutter teeth in grinding, of a jig by which the templet is carried, standards on the jig provided with grooved blocks, a cutter arbor resting on the standard and having beveled ends and eccentric trunnions engaging the grooves, and set screws in the blocks engaging the bevels on opposite sides of and above the axis of the arbor for retaining the arbor at the required lateral adjustment.

23. In a machine of the character described, the combination with a grinding wheel and a templet, of a rest for cutter teeth which is provided with a guide surface for engagement by the templet, whereby the teeth are ground to correspond with the configuration of the templet.

24. A machine of the character described, comprising a grinding wheel and means movable laterally of the wheel for raising and lowering the same, a cutter-carrying jig, a templet also carried by the jig, a rest for cutter teeth, and a guide surface for engagement by the templet.

25. A machine of the character described, comprising a grinding wheel, a jig, a templet and a cutter-carrying arbor adjustably supported by the jig, and a rest for cutter teeth provided with a guide surface for engagement by the templet.

26. A machine of the character described, comprising a grinding wheel, a jig, a templet and a cutter-carrying arbor carried by the jig, means for adjusting the arbor laterally on the jig, a rest for cutter teeth, and a guide surface for engagement by the templet.

27. A machine of the character described, comprising a grinding wheel, a jig and a cutter-carrying arbor and templet carried by the jig, a rest for cutter teeth comprising a guide surface for the templet and an enlargement provided with an opening to receive the edge of the wheel.

In testimony whereof I affix my signature.

WILLIAM O. BARNES.